US010774913B2

(12) United States Patent
Koyama

(10) Patent No.: US 10,774,913 B2
(45) Date of Patent: Sep. 15, 2020

(54) POWER DISTRIBUTION DEVICE

(71) Applicant: Honda Motor Co., Ltd., Tokyo (JP)

(72) Inventor: Shigeru Koyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 127 days.

(21) Appl. No.: 16/147,908

(22) Filed: Oct. 1, 2018

(65) Prior Publication Data

US 2019/0195328 A1 Jun. 27, 2019

(30) Foreign Application Priority Data

Dec. 25, 2017 (JP) ................................ 2017-247975

(51) Int. Cl.
*F16H 48/36* (2012.01)
*F16H 48/11* (2012.01)
(Continued)

(52) U.S. Cl.
CPC ............. *F16H 48/36* (2013.01); *B60K 17/16* (2013.01); *B60K 17/28* (2013.01); *B60K 23/04* (2013.01);
(Continued)

(58) Field of Classification Search
CPC .... F16H 48/36; F16H 48/11; F16H 2048/106; F16H 2048/104; F16H 2048/364; F16H 2200/0021; F16H 2200/201; B60K 23/04; B60K 17/16; B60K 17/165; B60K 2023/043; B60Y 2400/804
(Continued)

(56) References Cited

U.S. PATENT DOCUMENTS

| 5,409,425 A * | 4/1995 | Shibahata | B60K 23/04 475/150 |
| 6,098,737 A * | 8/2000 | Aoki | B60K 6/365 180/242 |
| 2004/0220011 A1* | 11/2004 | Gumpoltsberger | B60K 17/16 475/205 |
| 2015/0065282 A1* | 3/2015 | Honda | B60K 6/365 475/6 |

(Continued)

FOREIGN PATENT DOCUMENTS

| DE | 102004024086 A1 * | 12/2005 | ............ B60K 23/04 |
| JP | 5409748 | 2/2014 | |

(Continued)

OTHER PUBLICATIONS

English translation of JP2017150616A; http://translationportal.epo.org; Feb. 18, 2020 (Year: 2020).*

(Continued)

*Primary Examiner* — Roger L Pang
(74) *Attorney, Agent, or Firm* — JCIPRNET

(57) ABSTRACT

The power distribution device includes: a double pinion first planetary gear mechanism including a first sun gear, a first carrier, and a first ring gear; and a double pinion second planetary gear mechanism including a second sun gear, a second carrier, and a second ring gear. The first sun gear and the second carrier are connected to each other and connected to a first motor, and the first carrier and the second sun gear are connected to each other and connected to a second motor. The first ring gear and the second ring gear are respectively connected to a right output shaft and a left output shaft, and a gear ratio of the first ring gear to the first sun gear and a gear ratio of the second ring gear to the second sun gear are set to the same value.

4 Claims, 6 Drawing Sheets

(51) Int. Cl.
*B60K 17/16* (2006.01)
*B60K 23/04* (2006.01)
*B60K 25/06* (2006.01)
*B60K 17/28* (2006.01)
*F16H 48/10* (2012.01)

(52) U.S. Cl.
CPC .............. *B60K 25/06* (2013.01); *F16H 48/11* (2013.01); *B60K 2023/043* (2013.01); *B60Y 2400/804* (2013.01); *F16H 2048/104* (2013.01); *F16H 2048/106* (2013.01); *F16H 2048/364* (2013.01); *F16H 2200/0021* (2013.01); *F16H 2200/201* (2013.01)

(58) Field of Classification Search
USPC .................................................. 475/205, 203
See application file for complete search history.

(56) References Cited

U.S. PATENT DOCUMENTS

| | | | |
|---|---|---|---|
| 2017/0313172 A1* | 11/2017 | Meixner | B60K 6/365 |
| 2018/0208048 A1* | 7/2018 | Morio | B60K 17/046 |
| 2019/0105980 A1* | 4/2019 | Liu | B60K 6/365 |

FOREIGN PATENT DOCUMENTS

| | | |
|---|---|---|
| JP | 2015021594 | 2/2015 |
| JP | 2017150616 | 8/2017 |

OTHER PUBLICATIONS

English translation of JP2015021594A; http://translationportal.epo.org; Feb. 18, 2020 (Year: 2020).*
Office Action of Japan Counterpart Application, with English translation thereof, dated Jun. 11, 2019, pp. 1-7.

* cited by examiner

POWER DISTRIBUTION DEVICE

CROSS-REFERENCE TO RELATED APPLICATION

This application claims the priority benefit of Japan Application No. 2017-247975, filed on Dec. 25, 2017. The entirety of the above-mentioned patent application is hereby incorporated by reference herein and made a part of this specification.

BACKGROUND

Technical Field

The disclosure relates to a power distribution device for distributing power to two rotation shafts that are capable of performing mutually differential rotation.

Description of Related Art

The device disclosed in Patent Document 1 (Japanese Patent No. 5409748), for example, is known as a conventional power distribution device. The power distribution device is applied, for example, to a four-wheeled vehicle and distributes power to the left and right output shafts that are connected to the left and right wheels, and includes a rotatable carrier member, a triple pinion gear rotatably supported by the carrier member, a first rotating machine and a second rotating machine. The triple pinion gear is constituted by first to third pinion gears that have pitch circle diameters different from one another and are integrated with one another. The first pinion gear is engaged with a first sun gear integrated with the right output shaft, the second pinion gear is engaged with a second sun gear integrated with the left output shaft, and the third pinion gear is engaged with a third sun gear. The third sun gear is connected to the first rotating machine and the carrier member is connected to the second rotating machine.

In the above-described configuration, when power generation is performed by the first rotating machine, the carrier member is accelerated with respect to the left output shaft, by which a part of the torque of the left output shaft is transmitted to the right output shaft via the second sun gear, the triple pinion gear, and the first sun gear. On the other hand, when power generation is performed by the second rotating machine, the carrier member is decelerated with respect to the left output shaft, by which, contrary to the above, a part of the torque of the right output shaft is transmitted to the left output shaft via the first sun gear, the triple pinion gear, and the second sun gear. Torque distribution to the left and right output shafts is controlled by acceleration or deceleration of the carrier member achieved through the triple pinion gear as described above.

SUMMARY

As described above, in the conventional power distribution device, a triple pinion gear is used, and the first to third pinion gears of the triple pinion gear and the first to third sun gears engaged with them line up in three rows in the axial direction (hereinafter, simply referred to as "axial direction") of the output shaft. Therefore, the length in the axial direction is large and the power distribution device cannot be made compact.

Further, the difference between the torques distributed to the left and right output shafts is determined according to the gear ratio between the gear pairs of the first to third pinion gears of the triple pinion gear and the first to third sun gears. However, the gear ratio is subject to strength or assembly/manufacturing constraints, so it is difficult to obtain a large torque difference and torque distribution cannot be performed efficiently.

Besides, in the power distribution device, the gear ratio between the gear pairs of the first to third pinion gears of the triple pinion gear and the first to third sun gears or the connection relationship with the first and second rotating machines is configurated asymmetrically. Therefore, when the torque is transmitted from the left output shaft to the right output shaft, and conversely from the right output shaft to the left output shaft, even if the first rotating machine or the second rotating machine is controlled in the same manner, the obtained operations (torque distribution) are basically different. As a result, in order to make the operations the same, it is necessary to take measures such as selecting the optimal gear combination of the triple pinion gear or performing different controls on the first rotating machine and the second rotating machine.

In view of the above, the disclosure provides a power distribution device, which can downsize the device by shortening the axial-direction length and efficiently obtain a large torque distribution with a small torque of the rotating machine as well as easily secure the identity of the operations when the torque distribution directions differ.

In view of the above, according to an embodiment of the disclosure, a power distribution device is provided for distributing power to two rotation shafts (the left output shaft SFL and the right output shaft SFR in the embodiment (hereinafter, the same as here)) capable of performing mutually differential rotation. The power distribution device includes: a first planetary gear mechanism PG1 including a first sun gear S1, a first carrier C1 supporting a double pinion planetary gear (the first pinion gear P11 and the second pinion gear P12), and a first ring gear R1; a second planetary gear mechanism PG2 arranged in parallel to and coaxially with the first planetary gear mechanism PG1 and including a second sun gear S2, a second carrier C2 supporting a double pinion planetary gear (the first pinion gear P21 and the second pinion gear P22), and a second ring gear R2; and a first rotating machine (the first motor 11) and a second rotating machine (the second motor 12). The first sun gear S1 and the second carrier C2 are connected to each other and are connected to the first rotating machine, and the first carrier C1 and the second sun gear S2 are connected to each other and are connected to the second rotating machine. The first ring gear R1 is connected to one of the two rotation shafts (the right output shaft SFR) and the second ring gear R2 is connected to the other of the two rotation shafts (the left output shaft SFL), and a gear ratio (ZR/ZS) of the first ring gear R1 to the first sun gear S1 and a gear ratio (ZR/ZS) of the second ring gear R2 to the second sun gear S2 are set to values equal to each other.

According to this configuration, the power distribution device includes a double pinion first planetary gear mechanism having a first sun gear, a first carrier, and a first ring gear, and a double pinion second planetary gear mechanism having a second sun gear, a second carrier, and a second ring gear. The two planetary gear mechanisms are arranged in parallel to and coaxially with each other. The first sun gear and the second carrier are connected to each other, and the first carrier and the second sun gear are connected to each other. Further, the gear ratio of the first ring gear to the first sun gear and the gear ratio of the second ring gear to the second sun gear (hereinafter, the two gear ratios are collectively referred to as "gear ratio" as appropriate) are set to the same value.

According to the above configuration, as shown in FIG. 3, the rotational speeds of the first sun gear (the second carrier), the first ring gear, the second ring gear, and the first carrier (the second sun gear) are in a collinear relationship and arranged on a straight line in the collinear chart. Moreover, since the first planetary gear mechanism and the second planetary gear mechanism are double pinion gear mechanisms, in the collinear chart, the first sun gear (the second carrier) and the first carrier (the second sun gear) are located on the two outer sides and the first ring gear and the second ring gear are located on the inner side.

Moreover, the first sun gear and the second carrier are connected to the first rotating machine, the first carrier and the second sun gear are connected to the second rotating machine, the first ring gear is connected to one rotation shaft, and the second ring gear is connected to the other rotation shaft. According to the above configuration, the torques outputted from the first rotating machine and the second rotating machine are transmitted and distributed to the two rotation shafts via the first ring gear and the second ring gear.

In this case, by appropriately setting the above-mentioned gear ratios, the lever ratio A in the above-mentioned collinear chart (the ratio of the distance between the first sun gear and the first ring gear to the distance between the first ring gear and the second ring gear, and the ratio of the distance between the first carrier and the second ring gear to the distance between the first ring gear and the second ring gear) can be set to a large value. With such setting, the torques of the first rotating machine and the second rotating machine can be transmitted to the two rotation shafts at a large amplification rate corresponding to the lever ratio, which makes it possible to efficiently obtain a large torque distribution with small torques of the first rotating machine and the second rotating machine.

Further, in the above-described configuration, the first planetary gear mechanism and the second planetary gear mechanism and the connection relationship between the rotating elements thereof are symmetrical with each other. In addition, the connection relationship between the first planetary gear mechanism and the second planetary gear mechanism and the first rotating machine and the second rotating machine, and the connection relationship between the first planetary gear mechanism and the second planetary gear mechanism and the first rotation shaft and the second rotation shaft are also symmetrical with each other (refer to FIG. 1). Therefore, in the case of distributing the torque of the first rotating machine and the case of distributing the torque of the second rotating machine, for example, the same torque distribution can be obtained through the same control, and the identity of the operations can be easily ensured.

Moreover, in the power distribution device of the disclosure, two gear rows, i.e., the first planetary gear mechanism and the second planetary gear mechanism, are arranged in the axial direction. Therefore, compared with the conventional power distribution device in which three gear rows corresponding to the triple pinion gear are arranged in the axial direction, the axial-direction length can be shortened and the device can be downsized.

Further, according to another embodiment of the disclosure, in the power distribution device described above, the first sun gear S1 and the second sun gear S2 have the same number of teeth, and the first ring gear R1 and the second ring gear R2 have the same number of teeth.

According to this configuration, the above-described configuration that the gear ratio of the first ring gear to the first sun gear and the gear ratio of the second ring gear to the second sun gear are the same value is realized. Moreover, according to the above condition, it is possible to use sun gear parts of the same specification, which have the same pitch circle diameter or size besides the number of teeth, as both the first sun gear and the second sun gear, and likewise, it is possible to use ring gear parts of the same specification as the first ring gear and the second ring gear. Further, the sharing of the parts between the first planetary gear mechanism and the second planetary gear mechanism may also be applied to the planetary gear or the carrier, such that planetary gear modules of the same specification can be used. Thereby, the manufacturing cost can be reduced by mass production.

According to another embodiment of the disclosure, in the power distribution device described above, the two rotation shafts are left and right output shafts SFL and SFR that are connected to left and right wheels (the front wheels WFL and WFR) of a vehicle. One of the first rotating machine and the second rotating machine is controlled such that a slip rate RS of the left and right wheels becomes a predetermined slip rate (the grip maximum slip rate RSX), at which a grip force of the wheels is maximized, when the vehicle turns. The gear ratio ZR/ZS of the first ring gear R1 to the first sun gear S1 and the gear ratio ZR/ZS of the second ring gear R2 to the second sun gear S2 are set such that when the slip rate RS of the wheels becomes the predetermined slip rate, a rotational speed of one of the first rotating machine 11 and the second rotating machine 12 becomes 0.

According to this configuration, one of the first rotating machine and the second rotating machine is controlled such that the slip rate of the left and right wheels becomes the predetermined slip rate, at which the grip force of the wheels is maximized, when the vehicle turns, and when the slip rate of the wheels becomes the predetermined slip rate, the rotational speed of one of the first rotating machine and the second rotating machine becomes 0. Thereby, the grip force of the wheels can be maximized and the output of the rotating machine required at this time can be suppressed to the minimum.

DESCRIPTION OF THE EMBODIMENTS

Figure 1:
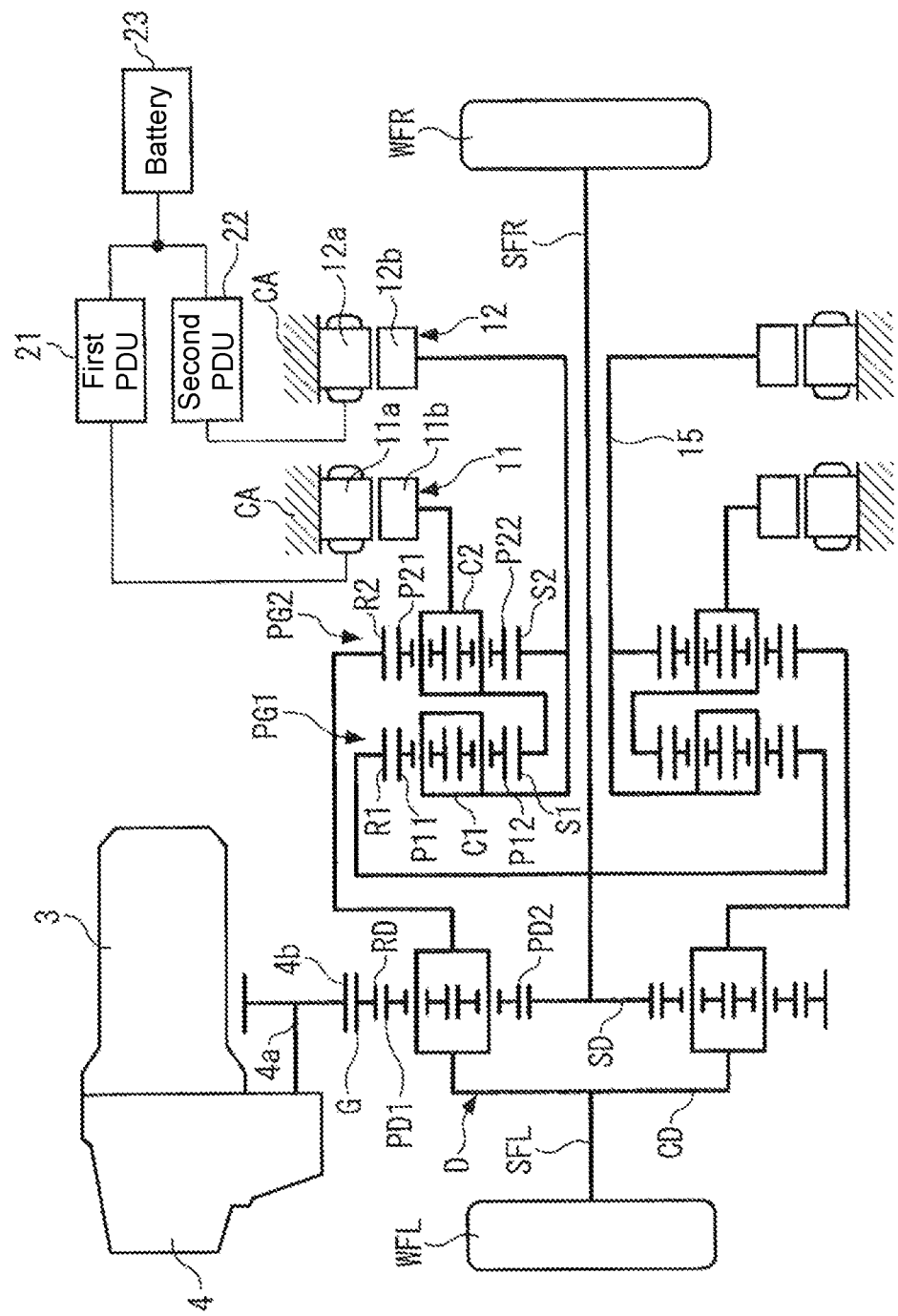
FIG. 1 is a diagram schematically showing the power distribution device according to an embodiment of the disclosure, together with drive wheels, etc. of the vehicle using the power distribution device.

Hereinafter, exemplary embodiments of the disclosure will be described in detail with reference to the figures. A power distribution device 1 shown in FIG. 1 is mounted on the front part of a four-wheeled vehicle (not shown) together with a differential device D (to be described later) and is used for distributing power to left and right output shafts SFL and SFR.

The left and right output shafts SFL and SFR are arranged coaxially with each other and are respectively connected to the left and right front wheels WFL and WFR, which are the drive wheels. An internal combustion engine (hereinafter, referred to as "engine") 3 serving as the power source and a transmission 4 are mounted on the front part of the vehicle, and the power of the engine 3 is transmitted to the power distribution device 1 via the differential device D in a state of being shifted by the transmission 4.

The power distribution device 1 includes a first planetary gear mechanism PG1, a second planetary gear mechanism PG2, a first motor 11 and a second motor 12. The above-mentioned differential device D, the first planetary gear mechanism PG1 and the second planetary gear mechanism PG2, and the first motor 11 and the second motor 12 of the power distribution device 1 are arranged coaxially with the left and right output shafts SFL and SFR and line up in this order from the left side.

The differential device D is constituted by a double pinion planetary gear mechanism and has a sun gear SD, a ring gear RD disposed on the outer circumference of the sun gear SD, a plurality of first pinion gears PD1 engaged with the ring gear RD, a plurality of second pinion gears PD2 engaged with the first pinion gears PD1 and the sun gear SD, and a carrier CD supporting the first pinion gears PD1 and the second pinion gears PD2 rotatably.

An external tooth gear G is formed on the outer circumferential part of the ring gear RD, and the external tooth gear G is engaged with a gear 4b that is integrally provided on an output shaft 4a of the transmission 4. Thereby, the power of the engine 3 is inputted to the ring gear RD in a state of being shifted by the transmission 4. The sun gear SD is integrally connected to the left end part of the right output shaft SFR and the carrier CD is integrally connected to the left output shaft SFL.

In the differential device D configured as above, when the vehicle is running straight, the torque inputted from the engine 3 to the ring gear RD via the transmission 4 is distributed to the carrier CD and the sun gear SD via the first pinion gears PD1 and the second pinion gears PD2 at a torque distribution ratio of 1:1.

The first planetary gear mechanism PG1 of the power distribution device 1 is a double pinion gear mechanism and includes a first ring gear R1, a first carrier C1, a plurality of first pinion gears P11, a plurality of second pinion gears P12, a first sun gear S1, etc. These rotating elements are all arranged coaxially with the left and right output shafts SFL and SFR.

The first ring gear R1 is integrally connected to the middle of the right output shaft SFR. A plurality of (for example, four) first pinion gears P11 are rotatably supported by the first carrier C1 and engaged with the first ring gear R1 (only two are shown). A plurality of (for example, four) second pinion gears P12 are rotatably supported by the first carrier C1 and engaged with the first pinion gears P11 (only two are shown). Moreover, the first sun gear S1 is engaged with a plurality of second pinion gears P12.

The second planetary gear mechanism PG2 is a double pinion gear mechanism and has exactly the same configuration as the first planetary gear mechanism PG1. That is, the second planetary gear mechanism PG2 includes a second ring gear R2, a second carrier C2, a plurality of first pinion gears P21, a plurality of second pinion gears P22, a second sun gear S2, etc., and the specification (number of teeth, pitch circle diameter, size, etc.) of each rotating element is exactly the same as that of the first planetary gear mechanism PG1.

Among these rotating elements of the second planetary gear mechanism PG2, the second ring gear R2 is connected to the left output shaft SFL via the carrier CD of the differential device D. The second carrier C2 is connected to the first sun gear S1 of the first planetary gear mechanism PG1 and is connected to a rotor 11b of the first motor 11. In addition, the second sun gear S2 is connected to the first carrier C1 and is connected to a rotor 12b of the second motor 12.

The first motor 11 is constituted by, for example, an AC motor and has a first stator 11a composed of a plurality of iron cores or coils, and the first rotor 11b composed of a plurality of magnets, etc. The first stator 11a is fixed to a stationary case CA. The first rotor 11b is disposed to face the first stator 11a and is connected to the second carrier C2 as described above to be rotatable integrally with the second carrier C2 and the first sun gear S1 connected thereto. In the first motor 11, when electric power is supplied to the first stator 11a, the supplied electric power is converted into power and outputted to the first rotor 11b. Further, when the power is inputted to the first rotor 11b, the power is converted into electric power (power generation) and outputted to the first stator 11a, and a battery 23 (to be described later) is charged (regeneration).

Figure 2:
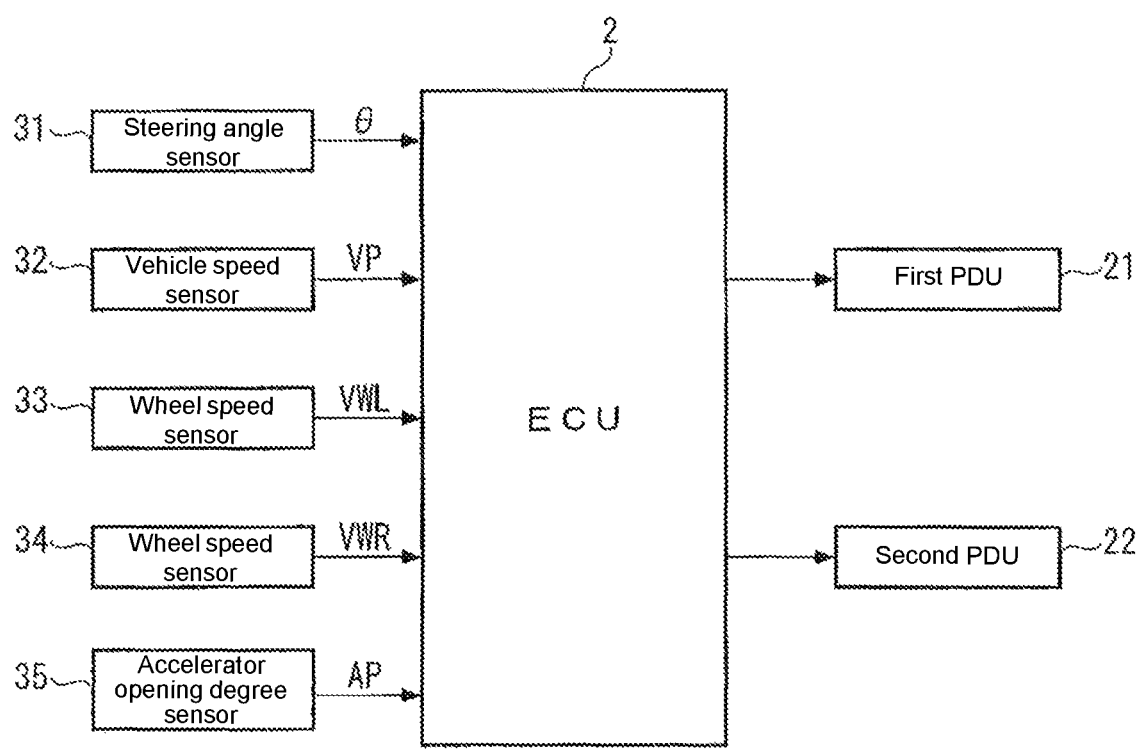
FIG. 2 is a block diagram showing the ECU, etc. for controlling the power distribution device.

In addition, the first stator 11a is electrically connected to the battery 23 that can be charged and discharged via a first power drive unit (hereinafter, referred to as "first PDU") 21, and can receive electric energy from the battery 23. The first PDU 21 is constituted by an electric circuit such as an inverter. As shown in FIG. 2, an ECU (electronic control unit) 2, which will be described later, is electrically connected to the first PDU 21. The ECU 2 controls the first PDU 21 so as to control the electric power supplied to the first stator 11a and the electric power generated by the first stator 11a.

Similar to the first motor 11, the second motor 12 is constituted by, for example, an AC motor and has a second stator 12a and a second rotor 12b. The second stator 12a and the second rotor 12b are respectively configured in the same manner as the first stator 11a and the first rotor 11b. As described above, the second rotor 12b is connected to the second sun gear S2 and is rotatable integrally with the second sun gear S2 and the first carrier C1 connected thereto. Similar to the first motor 11, the second motor 12 converts the electric power supplied to the second stator 12a into power and outputs it to the second rotor 12b, and converts the power inputted to the second rotor 12b into electric power and outputs it to the second stator 12a.

Further, the second stator 12a is electrically connected to the battery 23 via a second power drive unit (hereinafter, referred to as "second PDU") 22 and can receive electric energy from the battery 23. The second PDU 22 is configured in the same manner as the first PDU 21, and the ECU 2 is electrically connected to the second PDU 22. The ECU 2 controls the second PDU 22 so as to control the electric power supplied to the second stator 12a and the electric power generated by the second stator 12a.

As described above, in the power distribution device 1, since the first carrier C1, the second sun gear S2, and the second rotor 12b are integrally connected to one another, the rotational speeds of the three elements C1, S2, and 12b are equal to one another. Further, since the first sun gear S1, the second carrier C2, and the first rotor 11b are integrally connected to one another, the rotational speeds of the three elements S1, C2, and 11b are equal to one another. In addition, since the first ring gear R1 is directly connected to the right output shaft SFR, the rotational speeds of the two elements R1 and SFR are equal to each other. Further, since the second ring gear R2 is connected to the left output shaft SFL via the carrier CD of the differential device D, the rotational speed of the second ring gear R2 and the rotational speed of the left output shaft SFL are equal to each other.

Figure 3:
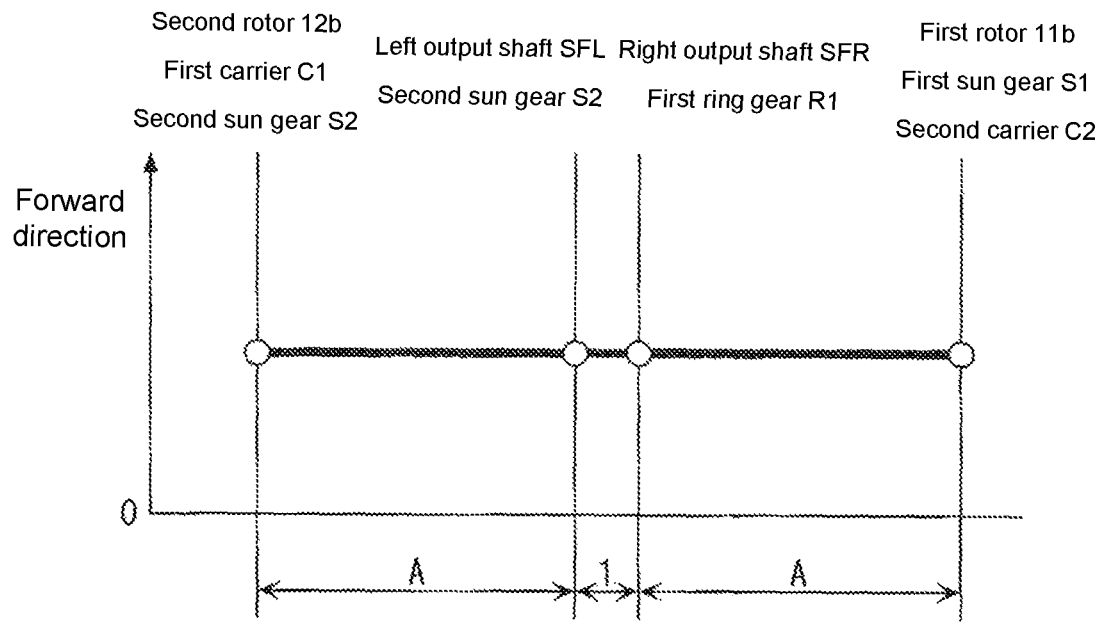
FIG. 3 is a collinear chart showing the relationship between the rotational speeds of various rotating elements in the power distribution device with respect to a straight running state of the vehicle.

Further, because the first planetary gear mechanism PG1 and the second planetary gear mechanism PG2 are double pinion gear mechanisms, the relationship between the rotational speeds of the above-mentioned various rotating elements in the power distribution device 1 is as shown in the collinear chart of FIG. 3, for example. Specifically, the first carrier C1 (the second sun gear S2, the second rotor 12b), the second ring gear R2 (the left output shaft SFL), the first ring gear R1 (the right output shaft SFR), and the first sun gear S1 (the second carrier C2, the first rotor 11b) are in a collinear relationship on a straight line in the collinear chart, and the second ring gear R2 and the first ring gear R1 are located between the first carrier C1 and the first sun gear S1.

In the collinear chart, the distance from the horizontal line indicating the value 0 to the white circle on the vertical line corresponds to the rotational speed of each rotating element. Further, A on the horizontal axis represents the lever ratio based on the distance between the first ring gear R1 and the second ring gear R2. Because the configurations of the first planetary gear mechanism PG1 and the second planetary gear mechanism PG2 and the connection relationship between the rotating elements are left-right symmetrical, the lever ratios A are equal to each other between the first carrier C1 (the second sun gear S2) and the second ring gear R2, and between the first ring gear R1 and the first sun gear S1 (the second carrier C2) and are expressed by the following equation (1), for example.

$$A=((ZR/ZS)-1)/(2-(ZR/ZS))=(ZR-ZS)/(2ZS-ZR) \quad (1)$$

Here, ZR is the numbers of teeth of the first ring gear R1 and the second ring gear R2 which are equal to each other (hereinafter, referred to as "ring gear tooth number"), ZS is the numbers of teeth of the first sun gear S1 and the second sun gear S2 which are equal to each other (hereinafter, referred to as "sun gear tooth number"), and ZR/ZS is the ratio of the ring gear tooth number ZR to the sun gear tooth number ZS (hereinafter, simply referred to as "gear ratio"). Further, when the equation (1) is expressed with respect to the gear ratio ZR/ZS, the following equation (2) is obtained.

$$ZR/ZS=(2A+1)/(A+1) \quad (2)$$

As known from the equation (1), the lever ratio A becomes a larger value as the gear ratio ZR/ZS is less than 2.0 and close to the value 2.0. Further, when the gear ratio ZR/ZS=2, the lever ratio A becomes infinite, that is, the relationship that the positions of the first ring gear R1 and the second ring gear R2 match each other in the collinear chart.

Moreover, in the present embodiment, the lever ratio A is set such that when the slip rate RS of the front wheel WFL and the front wheel WFR becomes a predetermined slip rate (hereinafter, referred to as "grip maximum slip rate") RSX at which the maximum grip force is obtained, the rotational speed of the first motor 11 or the second motor 12 becomes 0, and specifically the lever ratio A is calculated as A=100/RSX. For example, if RSX=5%, the lever ratio A is set to 100/5=20. The gear ratio ZR/ZS at this time becomes ZR/ZS=(2×20+1)/(20+1)=1.952 according to the equation (2). In addition, since the slip rate at which the maximum grip force is obtained is generally 10% or less, accordingly the lever ratio A is set to 10 or more, and the gear ratio ZR/ZS is set to the value 1.909 or more and other than 2.0.

The collinear chart shown in FIG. 3, etc. and the equation (1), etc. illustrate a case where the gear ratio ZR/ZS is less than 2.0. In a case where the gear ratio ZR/ZS is larger than 2 (not shown), the position of the first ring gear R1 and the second ring gear R2 are reverse in the collinear chart, and the first ring gear R1 is located on the left side and the second ring gear R2 is located on the right side. Moreover, the lever ratio A becomes a larger value as the gear ratio ZR/ZS gets close to the value 2.0.

In addition, as shown in FIG. 2, a detection signal indicating a steering angle θ of the steering wheel (not shown) of the vehicle from a steering angle sensor 31, a detection signal indicating the speed (vehicle speed) VP of the vehicle from a vehicle speed sensor 32, detection signals respectively indicating the speeds (hereinafter, referred to as "front wheel speeds") VWL and VWR of the left and right front wheels WFL and WFR from wheel speed sensors 33 and 34, and a detection signal indicating an operation amount (hereinafter, referred to as "accelerator opening degree") AP of the accelerator pedal (not shown) of the vehicle from an accelerator opening degree sensor 35 are respectively inputted to the ECU 2.

The ECU 2 is constituted by a microcomputer composed of an input/output (I/O) interface, a central processing unit (CPU), a random access memory (RAM), a read only memory (ROM), etc. The ECU 2 controls the first motor 11 and the second motor 12 via the first PDU 21 and the second PDU 22 in accordance with a control program stored in the ROM according to the detection signals from the various sensors 31 to 35 described above. The control and operation of the power distribution device 1 during straight running and turning of the vehicle will be described hereinafter.

When the vehicle runs straight, for example, zero torque control is performed on the first motor 11 and the second motor 12 to control their torques to be the value 0. The zero torque control is to prevent the occurrence of drag loss resulting from that the power of the engine 3 is transmitted to the first motor 11 and the second motor 12 via the differential device D, etc. and electric power is generated with idling of the first rotor 11b and the second rotor 12b.

When the vehicle runs straight, the torque of the engine 3 is distributed to the left and right output shafts SFL and SFR by the differential device D at the torque distribution ratio of 1:1. Moreover, with the above-mentioned zero torque control, as shown in FIG. 3, the torques of the two motors 11 and 12 are controlled to the value 0, by which the torque distribution of the power distribution device 1 is not performed and the power distributed to the left and right output shafts SFL and SFR by the differential device D is directly transmitted to the left and right front wheels WFL and WFR, and the vehicle runs straight in this state.

When the vehicle turns right, for example, electric power generation control is performed on the first motor 11 and zero torque control is performed on the second motor 12. The electric power generated by the first motor 11 charges the battery 23. The electric power generation control is performed, for example, as follows. First, a basic value of the electric power generated by the first motor 11 is calculated based on the detected steering angle θ or vehicle speed VP, accelerator opening degree AP, etc. Further, the slip rate of the left and right front wheels WFL and WFR is calculated based on the detected front wheel speeds VWL and VWR respectively, and the average value thereof is calculated as the slip rate RS. Then, a correction value is calculated for setting the slip rate RS to the predetermined grip maximum slip rate RSX, and the above-mentioned basic value is corrected by the correction value, so as to calculate the electric power generated by the first motor 11.

Figure 4:
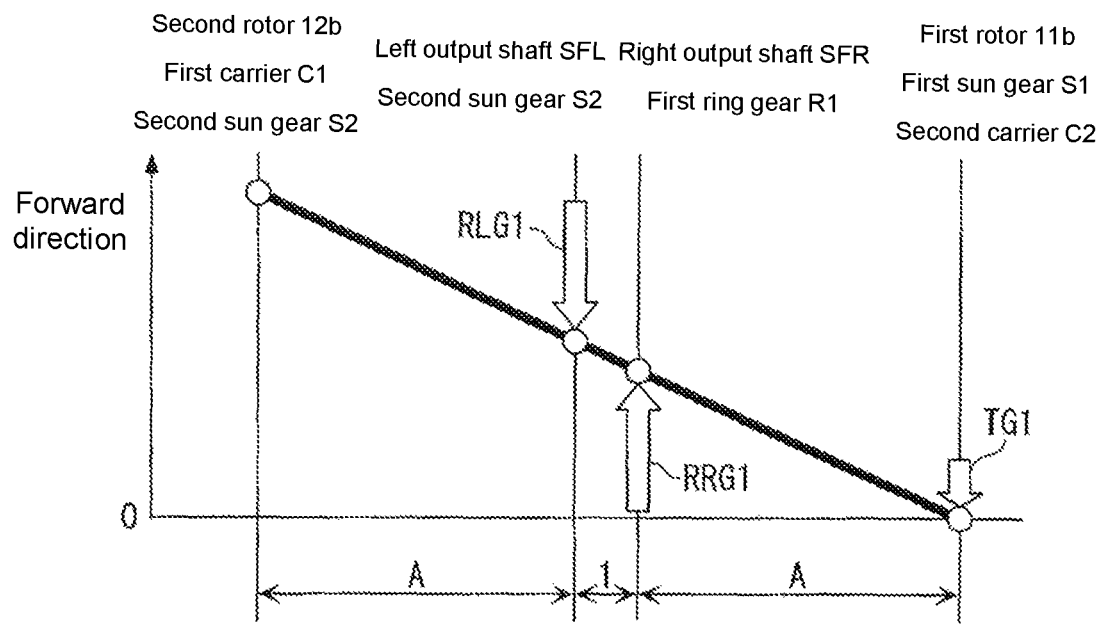
FIG. 4 is a collinear chart showing the relationship between the rotational speeds of various rotating elements in the power distribution device and the torque-balanced relationship with respect to a right turning state of the vehicle.

FIG. 4 shows the relationship between the rotational speeds of various rotating elements in the power distribution device 1 controlled as described above and the torque-balanced relationship. In FIG. 4, TG1 is a brake torque (hereinafter, referred to as "motor brake torque") generated on the first rotor 11b along with the electric power generation performed by the first motor 11. Further, RLG1 and RRG1 are reaction torques respectively acting on the left output shaft SFL and the right output shaft SFR, which accompany generation of the motor brake torque TG1.

In this case, the following equation (3) is established from the balance of the moment around the right output shaft SFR (torque×length of the arm), and the following equation (4) is established from the balance of the moment around the left output shaft SFL.

$$RLG1 \times 1 = RLG1 = TG1 \times A \quad (3)$$

$$RRG1 \times 1 = RRG1 = TG1 \times (A+1) \quad (4)$$

Moreover, the torque transmitted to the left output shaft SFL (hereinafter, referred to as "left output shaft transmission torque") is represented by RLG1 (drive torque), and the torque transmitted to the right output shaft SFR (hereinafter, referred to as "right output shaft transmission torque") is represented by −RRG1 (brake torque). Therefore, the drive torque that is A times the motor brake torque TG1 is transmitted to the left output shaft SFL in an amplified state, and the brake torque that is (A+1) times the motor brake torque TG1 is transmitted to the right output shaft SFR in an amplified state. As a result, the left output shaft transmission torque increases and the right output shaft transmission torque decreases, by which a torque difference is generated therebetween, and the vehicle makes a right turn in a state where the yaw moment of the right turn of the vehicle is increased.

When the torque difference as described above is generated between the left and right output shafts SFL and SFR, the rotational speed of the right output shaft SFR decreases and the rotational speed of the first motor 11 decreases. Further, as described above, in the electric power generation control, the motor brake torque TG1 is controlled such that the slip rate RS of the left and right front wheels WFL and WFR becomes the grip maximum slip rate RSX, and the lever ratio A is set such that when the slip rate RS becomes the grip maximum slip rate RSX, the rotational speed of the first motor 11 becomes 0. Therefore, as the electric power generation control progresses, the slip rate S is controlled to be the grip maximum slip rate RSX, and in the state where the grip force of the front wheels WFL and WFR is maximized, the rotational speed of the first motor 11 converges to around the value 0.

Figure 5:
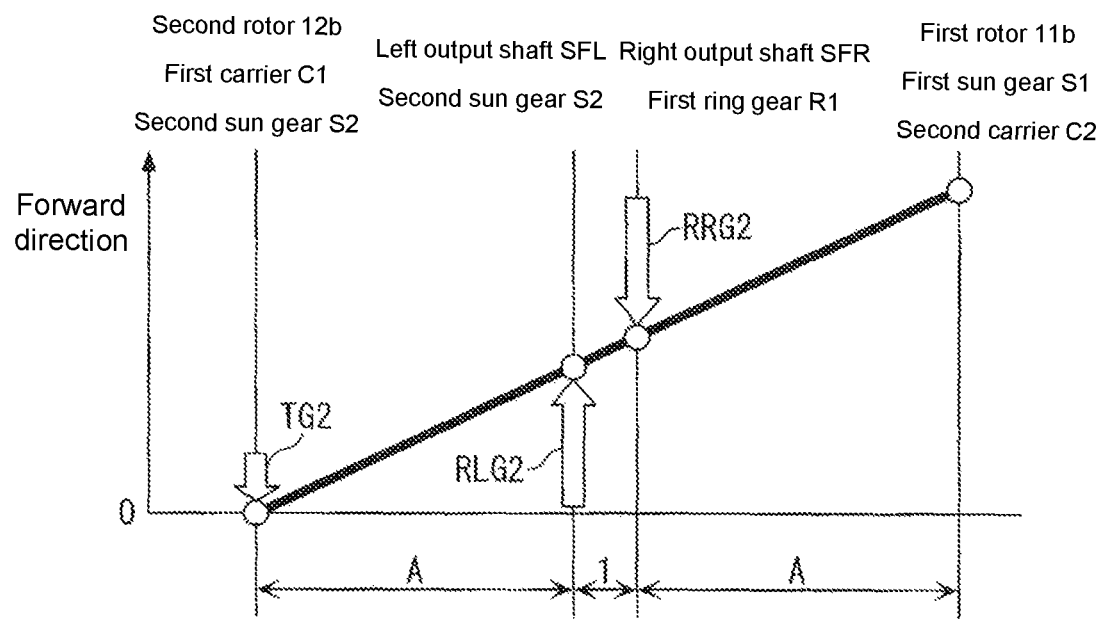
FIG. 5 is a collinear chart showing the relationship between the rotational speeds of various rotating elements in the power distribution device and the torque-balanced relationship with respect to a left turning state of the vehicle.

On the other hand, when the vehicle turns left, contrary to the situation of the right turn described above, electric power generation control is performed on the second motor 12 and zero torque control is performed on the first motor 11. Since the configurations of the first planetary gear mechanism PG1 and the second planetary gear mechanism PG2 and the connection relationship between the rotating elements are left-right symmetrical, the operation at this time is completely left-right reverse to the situation of the right turn described above. For example, FIG. 5 shows the relationship between the rotational speeds of various rotating elements in the power distribution device 1 and the torque-balanced relationship at this time. TG2 is the brake torque generated on the second rotor 12b along with the electric power generation performed by the second motor 12, and RRG2 and RLG2 are reaction torques respectively acting on the right output shaft SFR and the left output shaft SFL, which accompany generation of the brake torque TG.

Moreover, the right output shaft transmission torque is represented by RRG2 (drive torque) and the left output shaft transmission torque is represented by −RLG2 (brake torque). As a result, the right output shaft transmission torque increases and the left output shaft transmission torque decreases, by which a torque difference is generated therebetween, and the vehicle makes a left turn in a state where the yaw moment of the left turn of the vehicle is increased. The other operations are the same as the situation of the right turn but left-right reversed. Therefore, detailed descriptions thereof will be omitted.

As described above, according to the power distribution device 1 of the present embodiment, only two gear rows, i.e., the first planetary gear mechanism PG1 and the second planetary gear mechanism PG2, are arranged in the axial direction. Thus, compared with the conventional power distribution device in which three gear rows are arranged corresponding to the triple pinion gear, the axial-direction length can be shortened and the device can be downsized.

Moreover, in the state where the lever ratios A between the second motor 12 and the left output shaft SFL and between the first motor 11 and the right output shaft SFR are set to a large value (for example, 10 or more) and the brake torque of the first motor 11 or the second motor 12 is amplified by A times or (A+1) times, the power is transmitted and distributed to the left output shaft SFL and the right output shaft SFR as a drive torque or a brake torque. Thereby, a large torque distribution can be efficiently obtained with small torques of the first motor 11 and the second motor 12.

In the state where the slip rate RS of the left and right front wheels WFL and WFR is controlled to the grip maximum slip rate RSX by the electric power generation control during turning of the vehicle, the rotational speed of the first motor 11 or the second motor 12 converges near the value 0. Thereby, the grip force of the front wheels WFL and WFR can be maximized, and the output of the motor required at this time can be suppressed to the minimum.

Further, as shown in the above-described calculation example, since the slip rate at which the maximum grip force is obtained is generally 10% or less, the lever ratio A for it is set to 10 or more and the gear ratio ZR/ZS at this time is 1.909 or more. Thus, by setting the gear ratio ZR/ZS between the ring gear and the sun gear of the first planetary gear mechanism PG1 and the second planetary gear mechanism PG2 to near 2.0, the number of teeth of the sun gear or the first pinion gear and the second pinion gear is not too small. Therefore, the design and manufacture of the first planetary gear mechanism PG1 and the second planetary gear mechanism PG2 can be easily performed without any trouble.

In addition, since the configurations of the first planetary gear mechanism PG1 and the second planetary gear mechanism PG2 and the connection relationship between the rotating elements are left-right symmetrical, as described above, in the case of a right turn and a left turn, the same torque distribution can be obtained by performing the same control left-right reversely, and the identity of the operations can be easily ensured. Further, the configurations of the first planetary gear mechanism PG1 and the second planetary gear mechanism PG2 and the specification (number of teeth, pitch circle diameter, size, etc.) of the respective rotating element are completely the same. Therefore, it is possible to use planetary gear modules of the same specification, for example, by which the manufacturing cost can be reduced by mass production.

Figure 6:
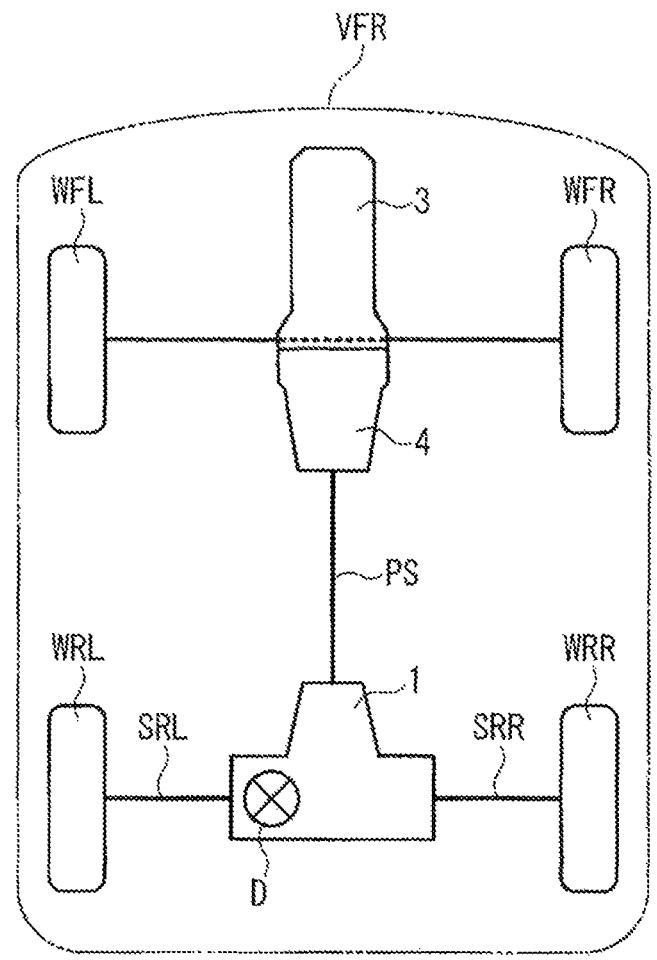
FIG. 6 is a diagram schematically showing a FR (front engine-rear drive) vehicle using the power distribution device according to the first modified example.

Next, a power distribution device according to the first modified example will be described with reference to FIG. 6. In the first modified example, the power distribution device 1 of the embodiment described above is applied to a FR (front engine-rear drive) vehicle VFR. In the vehicle VFR, the power distribution device 1 is disposed at the rear part of the vehicle VFR together with the differential device D, and a ring gear (not shown) of the differential device D is connected to the transmission 4 via a propeller shaft PS. Moreover, the connection relationship between the left and right output shafts SRL and SRR, the differential device D, the first planetary gear mechanism and the second planetary gear mechanism of the power distribution device 1, and the first motor and the second motor is the same as that of the embodiment, and the only difference is that the left and right output shafts SFL and SFR on the front side are replaced by the left and right output shafts SRL and SRR on the rear side.

According to the above configuration, the torque of the engine 3 is transmitted to the left and right output shafts SRL and SRR via the transmission 4, the propeller shaft PS, and the differential device D, and further transmitted to the left and right rear wheels WRLs and WRR. Further, the brake torque, etc. of the first motor and the second motor is distributed to the left and right output shafts SRL and SRR and further transmitted to the left and right rear wheels WRL and WRR. According to the above, the first modified example can also achieve the same effect as the above-described embodiment.

Figure 7:
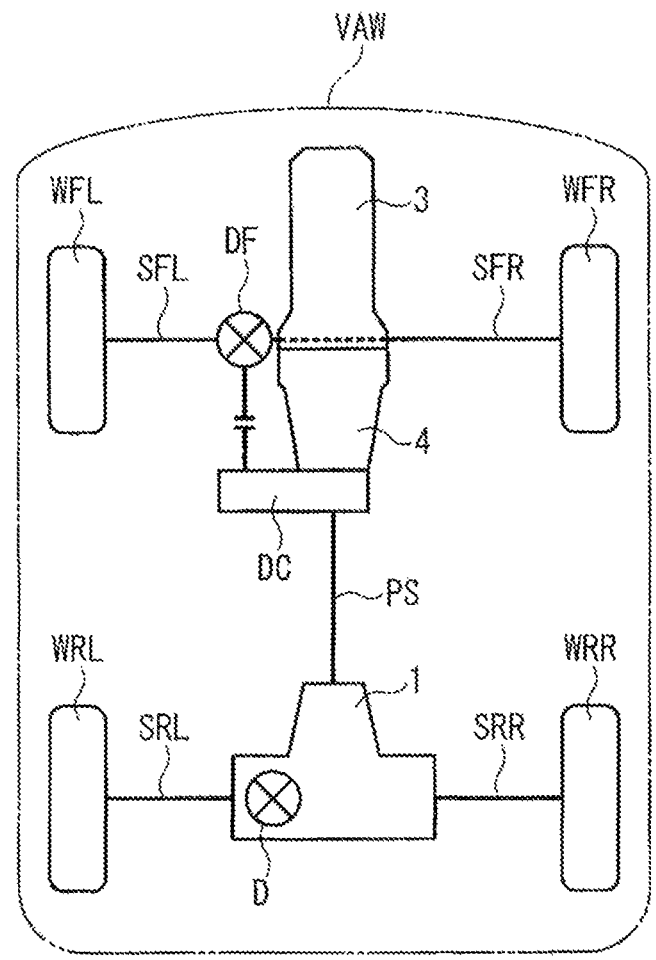
FIG. 7 is a diagram schematically showing an all-wheel-drive vehicle using the power distribution device according to the second modified example.

Next, a power distribution device according to the second modified example will be described with reference to FIG. 7. In the second modified example, the power distribution device 1 of the embodiment is applied to an all-wheel-drive vehicle VAW. In the vehicle VAW, the left and right output shafts SFL and SFR on the front side are connected to the engine 3 via a front differential DF, a center differential DC, and the transmission 4. The power distribution device 1 is disposed at the rear part of the vehicle VAW together with the differential device D, and a ring gear (not shown) of the differential device D is connected to the transmission 4 via the propeller shaft PS and the center differential DC. Further, the connection relationship between the left and right output shafts SRL and SRR, the differential device D, the first planetary gear mechanism and the second planetary gear mechanism of the power distribution device 1, and the first motor and the second motor is the same as that of the first modified example described above.

According to the above configuration, the torque of the engine 3 is transmitted to the center differential DC via the transmission 4 and is distributed to the front differential DF and the propeller shaft PS. The torque distributed to the front differential DF is transmitted to the left and right output shafts SFL and SFR and further transmitted to the left and right front wheels WFL and WFR. The torque distributed to the propeller shaft PS is transmitted to the left and right output shafts SRL and SRR via the differential device D and further transmitted to the left and right rear wheels WRL and WRR. Further, the brake torque, etc. of the first motor and the second motor is distributed to the left and right output shafts SRL and SRR via the first planetary gear mechanism and the second planetary gear mechanism and is further transmitted to the left and right rear wheels WRL and WRR. According to the above, the second modified example can also achieve the same effect as the above-described embodiment.

Nevertheless, the disclosure is not limited to the described embodiment and can be implemented in various forms. For example, the embodiment is an example of performing electric power generation control on the motor on the turning side and performing zero torque control on the motor on the opposite side for the first motor 11 and the second motor 12 when the vehicle turns. However, the disclosure is not limited thereto, and it is also possible to simultaneously perform electric power generation control on the motor on the turning side and perform discharge control on the motor on the opposite side. In this case, the same effect as the embodiment can also be achieved.

Moreover, the embodiment illustrates a case where the gear ratio ZR/ZS of the ring gear to the sun gear is less than the value 2.0. However, as described above, in the case where the gear ratio ZR/ZS is larger than the value 2.0, a larger the lever ratio A can be obtained as the gear ratio ZR/ZS gets close to the value 2.0. Thus, the same effect as the embodiment can be achieved.

Further, in the embodiment, the first ring gear R1 is connected to the right output shaft SFR and the second ring gear R2 is connected to the left output shaft SFL. However, in contrast thereto, the first ring gear R1 may be connected to the left output shaft SFL and the second ring gear R2 may be connected to the right output shaft SFR.

Additionally, the embodiment illustrates that planetary gear modules of the same specification are used as both the first planetary gear mechanism PG1 and the second planetary gear mechanism PG2. However, if the first planetary gear mechanism PG1 and the second planetary gear mechanism PG2 have the same gear ratio ZR/ZS which satisfies the above-mentioned condition, it is not necessary to use planetary gear modules of the same specification. Furthermore, although the embodiment is an example of applying the disclosure to a vehicle, the disclosure is not limited thereto and may also be applied to, for example, a ship or an airplane. In addition, details of the configuration may be changed as appropriate within the scope of the disclosure.

What is claimed is:

1. A power distribution device for distributing power to two rotation shafts capable of performing mutually differential rotation, the power distribution device comprising:
    a first planetary gear mechanism comprising a first sun gear, a first carrier supporting a double pinion planetary gear, and a first ring gear;
    a second planetary gear mechanism arranged in parallel to and coaxially with the first planetary gear mechanism and comprising a second sun gear, a second carrier supporting a double pinion planetary gear, and a second ring gear;

a third planetary gear mechanism comprising a third sun gear, a third carrier, and a third ring gear disposed on the outer circumference of the third sun gear; and a first rotating machine and a second rotating machine, wherein the first sun gear and the second carrier are connected to each other and are connected to the first rotating machine, the first carrier and the second sun gear are connected to each other and are connected to the second rotating machine, the first ring gear is connected to one of the two rotation shafts with the third sun gear and the second ring gear is connected to the other of the two rotation shafts via the third carrier, and a gear ratio of the first ring gear to the first sun gear and a gear ratio of the second ring gear to the second sun gear are set to values equal to each other.

2. The power distribution device according to claim 1, wherein the first sun gear and the second sun gear have the same number of teeth, and the first ring gear and the second ring gear have the same number of teeth.

3. The power distribution device according to claim 1, wherein the two rotation shafts are left and right output shafts that are connected to left and right wheels of a vehicle, one of the first rotating machine and the second rotating machine is controlled such that a slip rate of the wheels becomes a predetermined slip rate, at which a grip of the wheels is maximized, when the vehicle turns, and the gear ratio of the first ring gear to the first sun gear and the gear ratio of the second ring gear to the second sun gear are set such that when the slip rate of the wheels becomes the predetermined slip rate, a rotational speed of one of the first rotating machine and the second rotating machine becomes 0.

4. The power distribution device according to claim 2, wherein the two rotation shafts are left and right output shafts that are connected to left and right wheels of a vehicle, one of the first rotating machine and the second rotating machine is controlled such that a slip rate of the wheels becomes a predetermined slip rate, at which a grip of the wheels is maximized, when the vehicle turns, and the gear ratio of the first ring gear to the first sun gear and the gear ratio of the second ring gear to the second sun gear are set such that when the slip rate of the wheels becomes the predetermined slip rate, a rotational speed of one of the first rotating machine and the second rotating machine becomes 0.

* * * * *